US009876848B1

(12) United States Patent
Carroll et al.

(10) Patent No.: US 9,876,848 B1
(45) Date of Patent: Jan. 23, 2018

(54) TELEVISION KEY PHRASE DETECTION

(71) Applicant: Twitter, Inc., San Francisco, CA (US)

(72) Inventors: Andrew John Carroll, West Newton, MA (US); Richard Douglas Whitcomb, Jr., Winchester, MA (US); Wangfan Fu, La Jolla, CA (US); Thanabordi Jianrungsang, Berkeley, CA (US)

(73) Assignee: Twitter, Inc., San Francisco, CA (US)

( * ) Notice: Subject to any disclaimer, the term of this patent is extended or adjusted under 35 U.S.C. 154(b) by 235 days.

(21) Appl. No.: 14/187,056

(22) Filed: Feb. 21, 2014

(51) Int. Cl.
*H04L 12/70* (2013.01)
*H04L 29/08* (2006.01)
*G06K 9/00* (2006.01)

(52) U.S. Cl.
CPC .......... *H04L 67/10* (2013.01); *G06K 9/00536* (2013.01)

(58) Field of Classification Search
CPC ..................... H04L 41/0816; H04L 41/0803
USPC ........................................................ 709/203
See application file for complete search history.

(56) References Cited

U.S. PATENT DOCUMENTS

| | | | | |
|---|---|---|---|---|
| 2010/0274667 A1* | 10/2010 | Lanham | ............ | G06F 17/30026 705/14.49 |
| 2012/0192227 A1* | 7/2012 | Fleischman | ........ | H04N 21/2407 725/34 |
| 2012/0290407 A1* | 11/2012 | Hubbard | ................ | G06Q 30/02 705/14.72 |
| 2012/0330968 A1* | 12/2012 | Lee | ................... | G06F 17/30722 707/748 |
| 2013/0159127 A1* | 6/2013 | Myslinski | .............. | G06Q 30/00 705/26.1 |
| 2013/0246430 A1* | 9/2013 | Szucs | ................ | G06F 17/30011 707/738 |
| 2013/0332162 A1* | 12/2013 | Keen | ....................... | G10L 15/26 704/235 |
| 2013/0346144 A1* | 12/2013 | Ferren | .................. | G06K 9/3266 705/7.29 |

(Continued)

OTHER PUBLICATIONS

Bouthemy, P. et al., "A Unified Approach to Shot Change Detection and Camera Motion Characterization," IEEE Trans. on Circuits and Systems for Video Technology, Oct. 1999, 23 pages, vol. 9, No. 7.

(Continued)

*Primary Examiner* — Ario Etienne
*Assistant Examiner* — Elizabeth Kassa
(74) *Attorney, Agent, or Firm* — Fenwick & West LLP

(57) ABSTRACT

Images of key phrases or hashtags appear on televised feeds. Image processing techniques, such as feature locating algorithms or character recognition algorithms, can be used to locate the images of key phrases in the images. Then, character recognition algorithms can be used to generate a list of candidate key phrases for the key phrase in image format. However, identification of the key phrase in image format is not completely accurate with conventional methods. Social media content items associated with the televised feed are used to filter the list of candidate key phrases. Using known information about the televised feed as well as about key phrases in text format in the social media content items, candidate key phrases in the list of candidate key phrases can be scored and, thus, a final candidate key phrase selected based on the scores.

24 Claims, 10 Drawing Sheets

(56) References Cited

U.S. PATENT DOCUMENTS

2014/0114978 A1* 4/2014 Chatterjee .............. G06Q 50/01
707/739
2015/0019203 A1* 1/2015 Smith ............... G06F 17/30796
704/9

OTHER PUBLICATIONS

Epshtein, B. et al., "Detecting Text in Natural Scenes with Stroke Width Transform," Computer Vision and Pattern, IEEE, 2010, pp. 2963-2970.
Witten, I. et al., "Data Mining: Practical Machine Learning Tools and Techniques," $2^{nd}$ Edition, Morgan Kaufmann, San Francisco, CA, Jun. 2005, 34 pages.

* cited by examiner

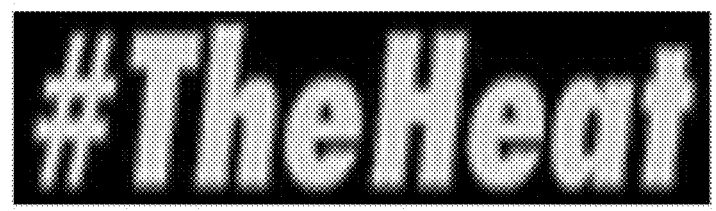
FIG. 7E

Key Phrase Location

List of Candidate Key Phrases 555 thecure
thedrum
theeast
theexes
thefall
thefive
thegame
thegirl
theheat
thehero
thehost
theking
thelife
thelist
thelmas
themess
themole
theopen
thepush
therapy
theread Key Phrases 610

Results for #theheat
Top / All
News Source @NewSource    8 Jul
Movie1 raked in $92 million over the holiday weekend with #Movie2 & #TheHeat coming in at 2nd & 3rd place. Which did you see?
Reposted 62 times
Expand Jane Doe1 @Jane_Doe1    8m
Finally get to see @user1 tonight!! #TheHeat
movienight
Expand Jane Doe2 @Jane_Doe2    10m
Seeing #TheHeat with @user2 and @user3 was a perfect thing to do on this crummy afternoon.
Expand John Doe @John.Doe    12m
THE HEAT: $3.47M Tuesday / $92.84M Domestic Total / 3,184 Locations / $1,091 Location Avg. #TheHeat Via @BoxOffice
Expand Jane Doe3 @Jane_Doe3    52m
Who brings a 7 year old to a rated R movie? #theheat #winningatparenting Final Candidate Key Phrase 230 thecure
thedrum
theeast
theexes
thefall
thefive
thegame
thegirl
theheat
thehero
thehost
theking
thelife
thelist
thelmas
themess
themole
theopen
thepush
therapy
theread

TELEVISION KEY PHRASE DETECTION

BACKGROUND

Online social media services, such as social networking sites, search engines, news aggregators, blogs, and the like provide a rich environment for users to comment on events of interest and communicate with other users. Content items contributed by users of these social media services often include references to events that appear in time-based media such as television shows, news reports, sporting events, movies, concert performances, and the like and time-based media display the references in image format. However, although the content items refer to the time-based media, the references displayed in time-based media are isolated from the social media content items.

BRIEF DESCRIPTION OF DRAWINGS

FIG. 7E is an example of additional processing on a key phrase location identified in the image of FIG. 7D, according to one embodiment.

FIG. 8A is an example of the embodiment of the key phrase location identified in FIG. 7E after additional processing in image format.

FIG. 8B is an example of a list of candidate key phrases in text format for the key phrase in image format from FIG. 8A, according to one embodiment.

FIG. 8C is an example of key phrases in text format in social media content items associated with the key phrase location in image format of FIG. 8A, according to one embodiment.

FIG. 8D is an example of a selected final candidate in the list of candidates of FIG. 8B, according to one embodiment.

The figures depict various embodiments of the disclosed method for purposes of illustration only. One skilled in the art will readily recognize from the following discussion that alternative embodiments of the structures and methods illustrated herein may be employed without departing from the principles of the disclosed method described herein.

DETAILED DESCRIPTION

Configuration Overview

A computer-executed method for identifying key phrases in images is disclosed. An image is accessed potentially including any number of unidentified key phrases. The unidentified key phrase can include any sequence of characters and can be part of the image (in image format). In one or more embodiments of the invention, characters of the key phrase can follow a predefined format and the key phrase can be identified by a predetermined formatting, for example the inclusion of a predetermined character/s or formatting element. For example, the key phrase can include a hash character (#) prefix. The image can be aired as part of a time based media event such as an instance of a television show. In one embodiment, the television show comprises an airing time stamp. A portion of the image associated with the key phrase is processed using a character recognition algorithm to generate a list of candidate key phrases in text format.

The list of candidate key phrases in text format is filtered using a plurality of social media content items authored by users of a social networking system. Each social media content item can include one or more key phrases. In one embodiment, at least one of the key phrases is previously associated with the television show and another of the key phrases may or may not be associated with the television show. In another embodiment, at least one of the key phrases is one of the candidate key phrases. The social media content items that are analyzed may also be filtered based at least in part on whether a time stamp (e.g., of sending, broadcasting, authorship) of a social media content item is within an interval amount of time from the airing time stamp of the image, and whether they match a particular domain ontology.

To determine a final candidate key phrase, an overlap is determined between the list of candidate key phrases and the key phrases of the social media content items. In one embodiment, the overlap is a score is generated for each candidate key phrase based on frequency of appearance of the candidate key phrase in the plurality of social media content items. In another embodiment, the score is further based on percent confidence in character recognition for the characters in the candidate key phrase. Based on the scores of the candidate key phrases, a final candidate key phrase is determined.

Key Phrase Identification Environment Overview

Figure 1:
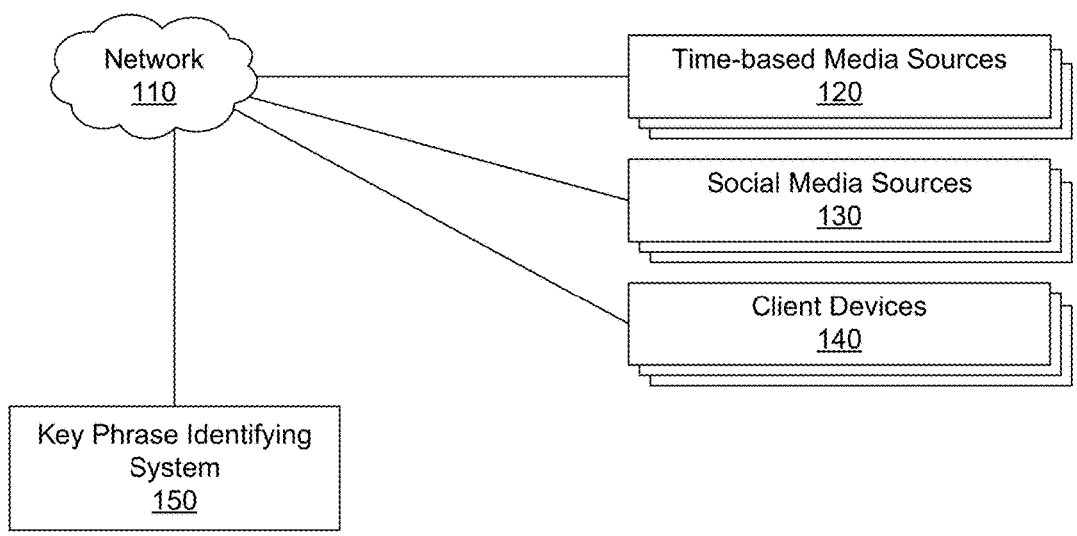
FIG. 1 illustrates a computing environment of a system for identifying key phrases in time-based media events, according to one embodiment.

FIG. 1 illustrates one embodiment of a computing environment 100 for a key phrase identifying system 150 for identifying key phrases in the time-based media events. The environment 100 includes a network 110, time-based media sources 120, social media sources 130, client devices 140, and the key phrase identifying system 150.

The network 110 may comprise any combination of local area and/or wide area networks, the Internet, or one or more intranets, using both wired and wireless communication systems.

The social media sources 130 include social networks, blogs, news media, forums, user groups, etc. These sources generally provide a plurality of users with the ability to communicate and interact with other users of the source. Users can typically contribute various content items (e.g., posts, videos, photos, links, status updates, blog entries, tweets, and the like), which may refer to media events, and can engage in discussions, games, online events, and other participatory services. These content items may also be referred to as social media content items.

The time-based media sources 120 include broadcasters, direct content providers, advertisers, and any other third-party providers of time-based media content. These sources 120 typically publish content such as television programs, videos, movies, serials, audio recordings, and the like.

The client devices 140 comprise computing devices that can receive input from a user and can transmit and receive data via the network 110. For example, client devices 140 may be a desktop computer, a laptop computer, a smart phone, a personal digital assistant (PDAs), or any other device including computing functionality and data communication capabilities. A client device 140 is configured to communicate with the social media sources 130 and the key phrase identifying system 150 via the network 110.

The key phrase identifying system 150 is a system for identifying key phrases in image format appearing in time-based media items. System 150 identifies key phrases based at least in part on image processing algorithms, as well as based on social media content items that include known associations with the time-based media items.

Key Phrase Identification Flowchart

Figure 2:
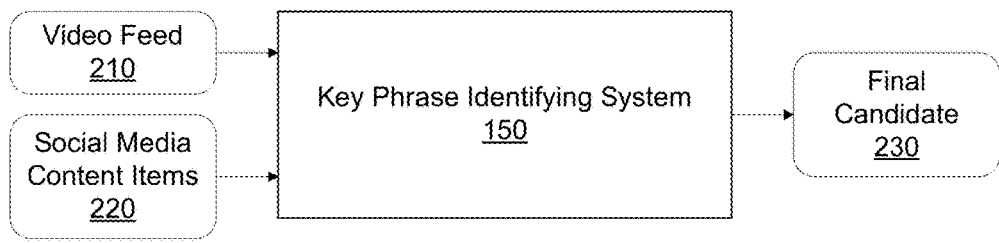
FIG. 2 is a flow diagram illustrating a key phrase identifying system, according to one embodiment.

FIG. 2 is a block diagram of an overall flowchart of the key phrase identifying system 150. Generally, the flowchart illustrates that the system 150 functions by receiving as input a video feed 210 and social media content items 220 and by outputting a final candidate key phrase 230.

More specifically, the system 150 receives the video feed 210 and generates a list of candidate key phrases based on the video feed 210. For example, the video feed 210 may present a television show including an overlaid graphic of a key phrase in image format associated with the television show, wherein the key phrase includes a formatting element, such as a hash character (#). The candidate key phrases are possible interpretations in text format of the key phrase in image format from the video feed 210. Character recognition algorithms can be used to identify the images of the key phrase. However, character recognition algorithms are not completely accurate when recognizing symbols or characters in images of text. Thus, the system 150 also receives the social media content items 220 and determines a score for each candidate key phrase in the list of candidate key phrases based on key phrases in the social media content items 220. Based on the determined scores of the candidate key phrases, the system 150 can rank the candidate key phrases and infer (or determine) a final candidate key phrase 230 in the list of candidate key phrases 555 that most likely represents the image of the key phrase in the video feed 210.

The video feed 210 received by the system 150 is broadcasted by the time-based media sources 120. Images of the video feed 210 are processed by the system 150 to locate portions of the images, each portion associated with a key phrase in image format. The system 150 uses an image processing algorithm and generates a list of candidate key phrases in text format for the key phrases in image format.

The social media content items 220 received by the system 150 are accessed from the social media sources 130. The social media content items 220 are used to score candidate key phrases in the list of candidate key phrases generated from processing the video feed 210. A result set of one or more final candidate key phrases (e.g., 230) is selected from the generated list of candidate key phrases based on the determined scores for the candidate key phrases.

Key Phrase Identification System Overview

Figure 3:
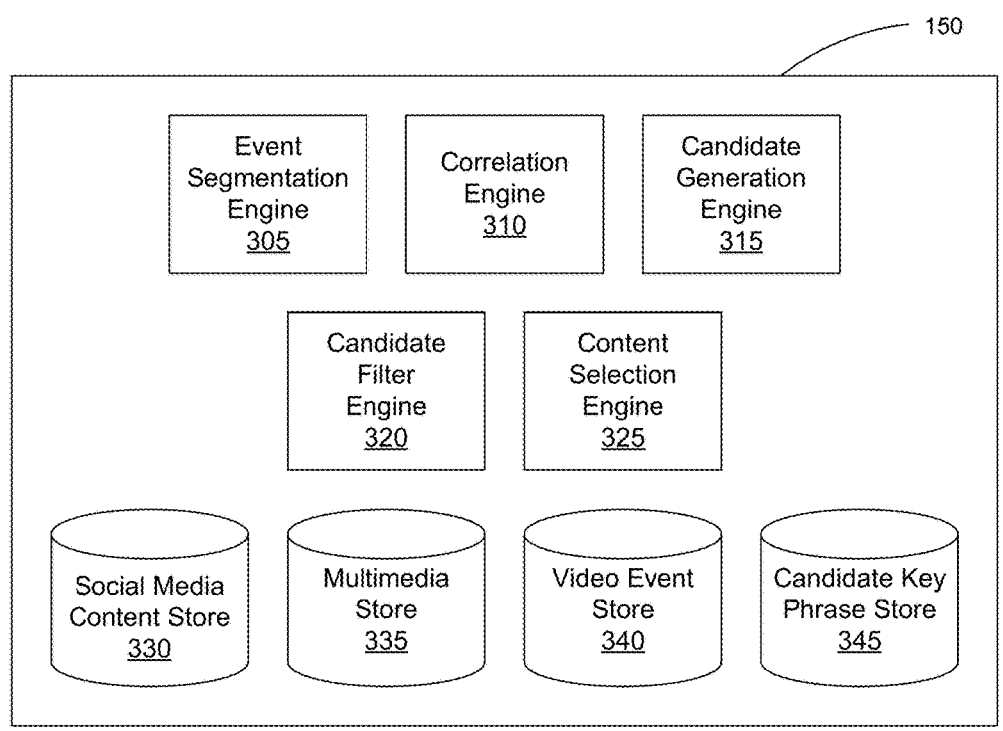
FIG. 3 is a block diagram of a key phrase identifying system, according to one embodiment.

FIG. 3 is a block diagram of one embodiment of the key phrase identifying system 150. The key phrase identifying system 150 shown in FIG. 3 is a computer system that includes an event segmentation engine 305, a correlation engine 310, a candidate generation engine 315, a candidate filter engine 320, a content selection engine 325, a social media content store 330, a multimedia store 335, a video event store 340, and a candidate key phrase store 345.

This system 150 may be implemented using a single computer, or a network of computers, including cloud-based computer implementations. The computers are preferably server class computers including one or more high-performance CPUs, 1 GB or more of main memory, as well as 500 GB to 2 TB of computer readable, persistent storage, and running an operating system such as LINUX or variants thereof. The operations of the system 150 as described can be controlled through either hardware or through computer programs installed in computer storage and executed by the processors of such servers to perform the functions described herein. The system 150 includes other hardware elements necessary for the operations described here, including network interfaces and protocols, security systems, input devices for data entry, and output devices for display, printing, or other presentations of data; these and other conventional components are not shown so as to not obscure the relevant details.

As noted above, system 150 comprises a number of "engines," which refers to hardware components and/or computational logic for providing the specified functionality. An engine can be implemented in hardware, firmware, and/or software (e.g., a hardware server comprising computational logic). An engine may sometimes be equivalently referred to as a "module" or a "server." It will be understood that the named components represent one embodiment of the disclosed method, and other embodiments may include other components. In addition, other embodiments may lack the components described herein and/or distribute the described functionality among the components in a different manner. Additionally, the functionalities attributed to more than one component can be incorporated into a single component. Where the engines described herein are implemented as software, the engine can be implemented as a standalone program, but can also be implemented through other means, for example as part of a larger program, as a plurality of separate programs, or as one or more statically or dynamically linked libraries. In any of these software implementations, the engines are stored on the computer readable persistent storage devices of the system 150, loaded into memory, and executed by the one or more processors of the system's computers. The operations of the system 150 and its various components will be further described below with respect to FIG. 3 and the remaining figures. As will become apparent, the various data processing operations described herein are sufficiently complex and time consuming as to require the operation of a computer system such as the system 150.

The multimedia store 335 stores various forms of time-based media. Time-based media includes any data that changes meaningfully with respect to time. Examples include, and are not limited to, videos (e.g., television programs or portions thereof, movies or portions thereof), audio recordings, MIDI sequences, animations, and combinations thereof. Time-based media can be obtained from a variety of sources, such as local or network stores, as well as directly from capture devices such as cameras, microphones, and live broadcasts. It is anticipated that other types of time-based media within the scope of the disclosed method will be developed in the future (e.g., 3D media, holographic presentations, immersive media, and so forth).

The event segmentation engine 305 segments time-based media into semantically meaningful segments corresponding to discrete portions or "events" to more easily identify an image in the time-based media believed to have an image of a key phrase. Different types of media may have different types of events which are recognized as part of a video event segmentation process 400, further described in FIG. 4. For example, a television program or movie may have scenes and shots; a sporting event may have highly granular events (e.g., plays, passes, catches, hits, shots, baskets, goals, and the like) as well has less granular events (e.g., sides, downs, innings, and the like). A new program may have events such as stories, interviews, shots, commentary and the like. The video event segmentation process 400 includes three main components according to one embodiment: shot boundary detection, event detection, and boundary determination. These components for event segmentation 400 may vary by domain. The output of video event segmentation 400 is a set of segmented video events that is stored in the video event store 340. Each segmented video event includes a number of images, one of which can be selected for analysis and identification of one or more key phrases.

The candidate generation engine 315 analyzes selected images of a segmented video event from a video feed 210 to generate a list of candidate key phrases to represent each image of a key phrase in the selected images. In one embodiment, the selected images are selected based on associations of the segmented video event or selected images of the segmented video event with social media content items 220 including relevant key phrases. Other embodiments of selecting the selected images comprise manual selection, random selection, or other suitable algorithm-based selection methods.

The candidate generation engine 315 generates a list of candidate key phrases by processing a selected image using a feature locating algorithm and a character recognition algorithm. Other embodiments include processing the selected image using alternative image processing algorithms to locate features and identify characters in the image. The feature-locating algorithm locates portions that may be associated with an image of a key phrase. The key phrase can be identified by detecting the presence of a formatting element, such as a hash character. Once the key phrase locations or portions are identified, the key phrase locations are processed using a character recognition algorithm (e.g., optical character recognition or OCR). Then, a list of candidate key phrases for the image of the key phrase in the key phrase location is generated by the candidate generation engine 315. In one embodiment, the list of candidate key phrases is stored in a candidate key phrase store 345.

The correlation engine 310 processes social media content items 220 to identify key phrases and/or to associate the key phrases with TV shows or other time-based media. The correlation engine 310 determines whether or not a social media content item 220 is relevant to a time-based media by inferring whether or not the social media content item 220 is referring to the time-based media, either directly or indirectly. Social media content items 220 are often ambiguous as to whether they refer to a time-based media, and if so, which time-based media they refer to. For example, a social media content item 220 such as the single word post "Touchdown!" may refer to a football game, or may be used as a metaphor for a success in areas unrelated to football. The correlation engine 310 is determined to resolve this ambiguity. For example, for a social media content item 220, the correlation engine 310 can compute a confidence score indicating the confidence that the social media content item 220 refers to the time-based media. If the confidence score exceeds a threshold confidence score, the social media content item 220 is considered correlated (or relevant to) the time-based media, and an association of the social media content item 220 with the correlated time-based media is stored, for example, in the social media content store 330. In one embodiment, an association of the correlated time-based media with the social media content item 220 is stored in the video event store 340.

The correlation engine 310 uses the above described determinations of which social media content items are relevant to which time based media events to associate key phrases contained within the social media content items to time based media events. For example, the correlation engine 310 may have determined that a number of social media content items 220 are relevant to a first time-based media event. Based on this relevancy determination, the correlation engine 310 then associates key phrases that appear in the social media content items 220 with the first time-based media event. This association may be through scoring each key phrase that appears. For example, if there are twenty instances of a first key phrase and only two instances of a second key phrase in the plurality of social media content items 220 relevant to the first time based media event, the correlation engine 310 may determine a first score for the first key phrase that is higher than a second score for the second key phrase, wherein the scores are based at least in part on a number of instances of the key phrases in the plurality of social media content items 220. Therefore, the correlation engine 310 may conclude that the first key phrase is relevant to the first time based media event and that the second key phrase is not relevant to the first time based media event. Consequently, an association between the first key phrase and the time based media event is stored in video event store 340.

The social media content store 330 stores social media content items 220 accessed from the social media sources 130. The social media content items include long form and short form social media content items such as posts, videos, photos, links, status updates, blog entries, short messages, the like from various social media sources and any combination thereof. In general, social networks allow their users to broadcast content viewable to various other users.

The candidate filter engine 320 filters the list of candidate key phrases using key phrases that appear in a subset social media content items and determines a final candidate key phrase that most likely matches what appeared in the image from the time based media event. In one embodiment, the candidate filter engine 320 also filters the social media content items to include only those social media content items having a broadcast time stamp during or after the airing of the time based media event in which the selected image appeared. The candidate filter engine 320 may perform domain ontology filtering to filter the subset of social media content items that are used to determine the final candidate key phrase.

The candidate filter engine 320 determines a score for each candidate key phrase in the list of candidate key phrases. In one embodiment, the score for a candidate key phrase is determined based on frequency of appearance of the key phrase in the subset of social media content items with known association to the segmented video event 435 including the selected images. In another embodiment, the confidence scores of the characters of the candidate key phrase may also be used to determine the score of the candidate key phrase. In other embodiments, the score for a candidate key phrase is determined based on frequency of appearance of the key phrase in social media content items with broadcast time stamps within an interval amount of time from an airing time stamp of the segmented video event 435. Based on the determined scores, a final candidate key phrase 230 with a highest score is selected that best represents the image of the key phrase in the portion of the selected image. In one embodiment, the final candidate key phrase 230 is stored in the candidate key phrase store 345.

The content selection engine 325 selects content items to present to one or more users of the social networking system based at least in part on the final candidate key phrase 230 determined by the candidate filter engine 320 stored in the candidate key phrase store 345. In one embodiment, the content selection engine 325 selects content items based at least in part on the subset of social media content items with known associations to the segmented video event 435 including the selected images. For example, if a social media content item with known association to the segmented video event 435 comprises the final candidate key phrase 230 as well as an additional key phrase 230 with no known association to the segmented video event 435 but to, for example, another segmented video event 435 or topic, content items with known associations to the another segmented video event 435 or topic can be selected for presentation to one or more users of the social networking system. In various embodiments, the content items with known associations to the another segmented video event 435 can be selected if a number of instances of the additional key phrase 230 in the subset of social media content items exceeds a threshold number of instances.

Video Event Segmentation Overview

Figure 4:
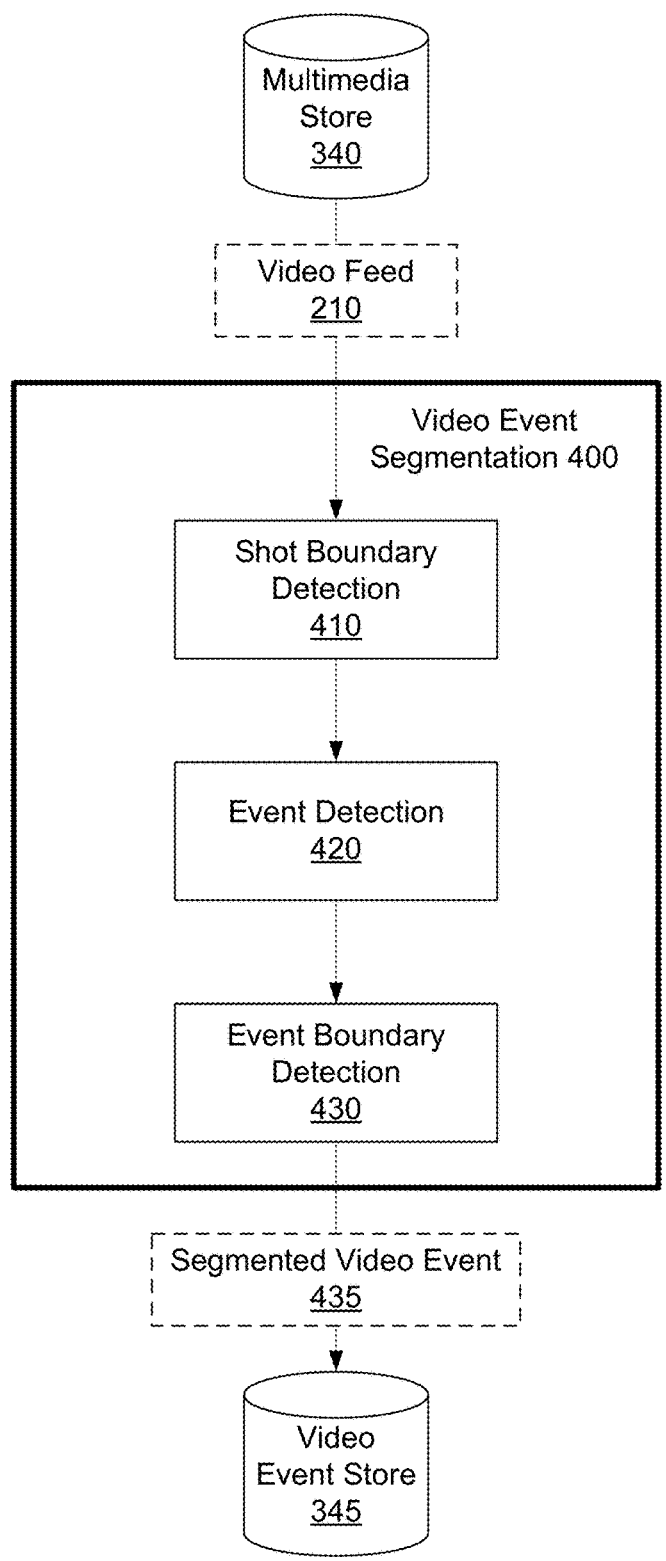
FIG. 4 is a flow diagram illustrating a video event segmentation process, according to one embodiment.

FIG. 4 is a flow diagram illustrating one embodiment of a video event segmentation process 400. In the video event segmentation process 400, time-based media is segmented into semantically meaningful segments corresponding to discrete events depicted in video. The input to the video event segmentation process 400 is a raw video (and/or audio) stream or feed that is retrieved from the multimedia store 335 according to one embodiment, and may be performed, e.g., by the event segmentation engine 305, which is one means for performing this function.

The video event segmentation process 400 can be domain dependent. For example, in videos of sporting events, event segments may be equated with individual plays, while in broadcast television, event segments may be equated with individual scenes and advertisements. Thus, the event types and segment size may vary based on the domain type, and for some media, e.g., short format media such as very short video clips, the entire clip can be treated as one segment. The system may be pre-configured with information about to which domain the video belongs. This configuration may be implemented by hand on a case by case basis, or based on a preloaded schedule based on the source of video and time of day (using, for example, a programming guide of broadcast television shows).

Segmentation may be achieved via human annotation, a computer-automated method, and/or a hybrid human/automatic approach in which automatic segment boundaries are corrected by human annotators according to various embodiments.

The video event segmentation process 400 can include three components according to one embodiment: shot boundary detection, event detection, and/or boundary determination. These components may vary by domain. For example, for sporting events an additional component may correspond to scene classification (e.g., field or stadium identification).

The output of video event segmentation process 400 is a set of segmented video 435 events that are stored in the video event store 340. The video event segmentation process 400 is described in further detail below.

Event Segmentation

The video event segmentation process 400 segments time-based media into semantically meaningful segments corresponding to discrete video portions or "events," e.g., via event segmentation engine 305, which is one means for performing this function.

Input to the video event segmentation process 400 is a video feed 210 from the multimedia store 335. Video event segmentation 400 includes 3 phases: shot boundary detection 410, event detection 420, and event boundary determination 430, each of which is described in greater detail below. The output of video event segmentation 400 is a segmented video event 435, which is stored in the video event store 340.

Shot Boundary Detection

The first step in segmenting is shot boundary detection 410 for discrete segments (or "shots") within a video. Shot boundaries are points of non-continuity in the video, e.g., associated with a change in a camera angle or scene. Shot boundaries may be determined by comparing color histograms of adjacent video frames and applying a threshold to that difference. Shot boundaries may be determined to exist wherever the difference in the color histograms of adjacent frames exceeds this threshold and/or based on motion features. A variety of techniques can be used for shot boundary detection, in accordance with various embodiments of the invention.

Event Detection

Event detection 420 identifies the presence of an event in a stream of one or more segments using various features corresponding, for example, to the image, audio, and/or camera motion for a given segment. A classifier using such features may be optimized by hand or trained using machine learning techniques such as those implemented in the WEKA machine learning package described in Witten, I. and Frank, E., *Data Mining: Practical machine learning tools and techniques* (2nd Edition), Morgan Kaufmann, San Francisco, Calif. (June 2005). The event detection process 420 details may vary by domain.

Image features are features generated from individual frames within a video. They include low level and higher level features based on those pixel values. Image features include, but are not limited to, color distributions, texture measurements, entropy, motion, detection of lines, detection of faces, presence of all black frames, graphics detection, aspect ratio, and shot boundaries.

Speech and audio features describe information extracted from the audio and closed captioning streams. Audio features are based on the presence of music, cheering, excited speech, silence, detection of volume change, presence/absence of closed captioning, etc. According to one embodiment, these features are detected using boosted decision trees. Classification operates on a sequence of overlapping frames (e.g., 30 ms overlap) extracted from the audio stream. For each frame, a feature vector is computed using Mel-frequency cepstral coefficients (MFCCs), as well as energy, the number of zero crossings, spectral entropy, and relative power between different frequency bands. The classifier is applied to each frame, producing a sequence of class labels. These labels are then smoothed using a dynamic programming cost minimization algorithm, similar to those used in hidden Markov models.

In addition to audio features, features may be extracted from the words or phrases spoken by narrators and/or announcers. From domain ontologies 330, a predetermined list of words and phrases is selected and the speech stream is monitored for the utterance of such terms. A feature vector representation is created in which the value of each element represents the number of times a specific word from the list was uttered. The presence of such terms in the feature vector correlates with the occurrence of an event associated with the predetermined list of words. For example, the uttering of the phrase "touchdown" is correlated with the occurrence of a touchdown in sports video.

Unlike image and audio features, camera motion features represent more precise information about the actions occurring in a video. The camera acts as a stand in for a viewer's focus. As actions occur in a video, the camera moves to follow it; this camera motion thus mirrors the actions themselves, providing informative features for event identification. Like shot boundary detection, there are various methods for detecting the motion of the camera in a video (i.e., the amount it pans left to right, tilts up and down, and zooms in and out). One exemplary system is described in Bouthemy, P., et al., *A unified approach to shot change detection and camera motion characterization*, IEEE Trans. on Circuits and Systems for Video Technology, 9(7) (October 1999); this system computes the camera motion using the parameters of a two-dimensional affine model to fit every pair of sequential frames in a video. According to one embodiment, a 15-state first-order hidden Markov model is used, implemented with the Graphical Modeling Toolkit, and then the output of the Bouthemy is output into a stream of clustered characteristic camera motions (e.g., state 12 clusters together motions of zooming in fast while panning slightly left). Some domains may use different, or additional, methods of identifying events. For example, in American football, an additional factor may be scene classification. In scene classification, once a shot boundary is detected a scene classifier is used to determine whether that shot is primarily focused on a particular scene, e.g., a playing field. Individual frames (called key frames) are selected from within the shot boundaries and represented as a vector of low level features that describe the key frame's color distribution, entropy, motion, etc. A shot is determined to be of a particular scene if a majority of the sampled frames is classified as that scene.

Event Boundary Determination

Once a segment of video is determined to contain the occurrence of an event, the beginning and ending boundaries of that event can be determined 430. In some cases, the shot boundaries determined in 410 are estimates of the beginning and end of an event. The estimates can be improved as well by exploiting additional features of the video and audio streams to further refine the boundaries of video segments. Event boundary determination 430 may be performed using a classifier that may be optimized by hand or using supervised learning techniques. The classifier may make decisions based on a set of rules applied to a feature vector representation of the data. The features used to represent video overlap with those used in the previous processes. Events have beginning and end points (or offsets), and those boundaries may be determined based on the presence/absence of black frames, shot boundaries, aspect ratio changes, etc., and have a confidence measure associated with the segmentation. The result of event boundary determination 430 (concluding the video event segmentation process 400) is a set of segmented video event 435 that is stored in the video event store 340.

Candidate Generation Process Overview

Figure 5:
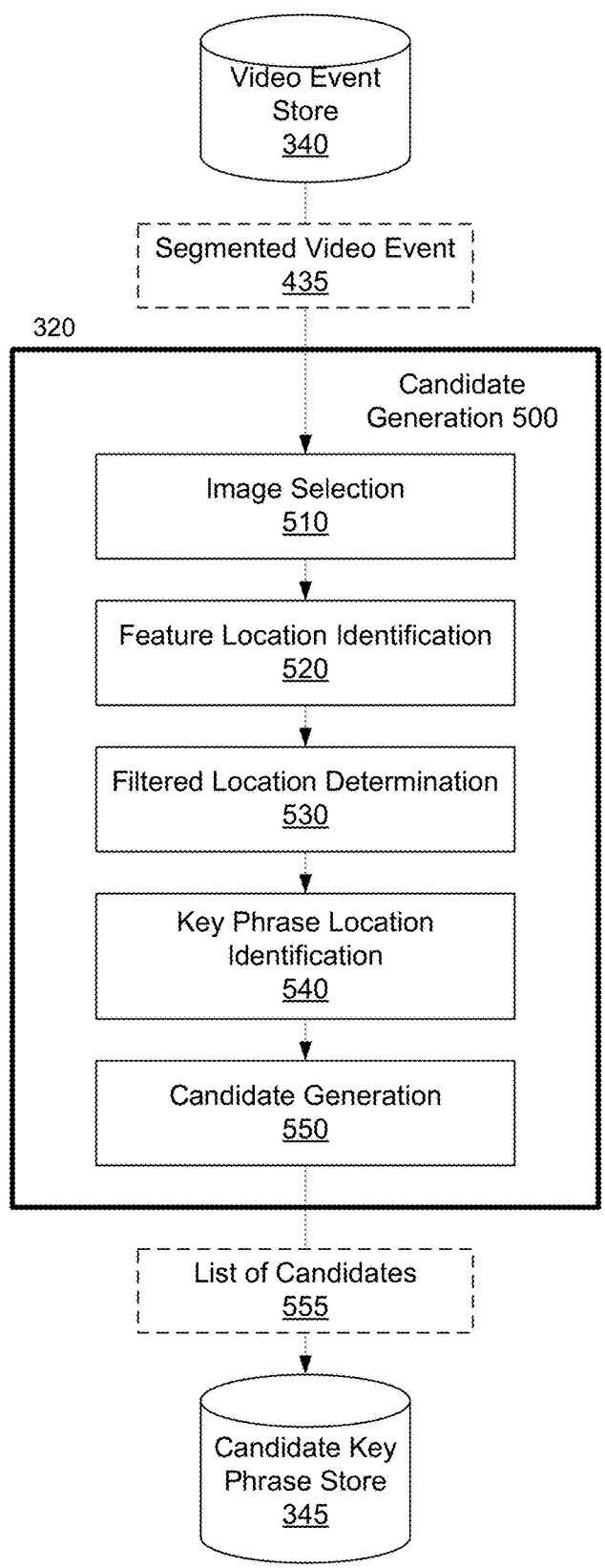
FIG. 5 is a flow diagram illustrating a candidate generation process, according to one embodiment.

FIG. 5 is a flow diagram illustrating one embodiment of a process of generating candidate key phrases 500 performed by the candidate generation engine 315. The candidate generation engine 315 accesses selected images of a segmented video event 435 and processes the selected image identify one or more key phrases. For example, key phrases comprise symbols including letters and numbers. In one embodiment, the segmented video event 435 is accessed from the video event store 340.

Initially, an image is selected 510 from the segmented video event 435. The candidate generation engine 315 identifies 520 feature locations within the selected image using one or more feature-locating algorithms. Examples of feature-locating algorithms can include, but are not limited to, edge-detection algorithms, cluster-detecting algorithms, and other suitable transforms for identifying features in an image. In one embodiment, the feature-locating algorithm is the stroke-width transform. The stroke-width transform identifies locations of features, called feature locations herein. The feature locations comprise a cluster of connected pixels. For example, the pixels can be connected based on pixel value.

The candidate generation engine 315 includes its own filtering algorithms to determine 530 a set of filtered feature locations likely to include text. More specifically, the filtering algorithm may have specific criteria configured to indicate the presence of text including, for example, area, intensity, or variance or any other suitable attributes associated with pixels in an image. In the embodiment with the stroke-width transform, the filtering algorithms filter out feature locations including clusters with widths that do not exceed a threshold width value, thus determining filtered locations with clusters including widths that exceed the threshold width value.

The candidate generation engine 315 identifies 540 key phrase locations from the filtered locations using one or more character recognition algorithms. A key phrase location is a location within the selected image that contains an image of a key phrase. For example, the key phrase may include a formatting element such as a hash character (#) as well any number of characters usually (though not necessarily) representing symbols, letters, and/or numbers (e.g., "#hash11").

The candidate generation engine 315 generates 550 a list of candidate key phrases for the key phrase in image format by processing the key phrase locations with one or more character recognition algorithms. Candidate key phrases are possible text interpretations of the image format of the key phrase. In one embodiment, the character recognition algorithm used is optical character recognition (OCR). Using OCR to process the key phrase locations results in possible symbols of the symbols in the key phrase. As OCR is not always completely accurate, OCR of some characters may result in an ambiguous conclusion as to what symbol appears in the image. For example, if the key phrase is an image of "#hash11," possible symbols for the first symbol "#" in the key phrase can be "#" or "@," "h" can be "b" and "h," for the second symbol "a" can be "a" and "e," and so on. In one embodiment, OCR of each character provides both the character and a confidence that the character was correctly interpreted. Using the possible symbols, a list of candidate key phrases 555 for the image of the key phrase are generated 550 based on possible permutations of the possible symbols. Continuing with the example, possible permutations can start with "#b . . . " or "#h . . . " for the image of the key phrase "#hash11." Thus, the list of candidate key phrases 555 comprises these possible permutations. The list of candidate key phrases 555 can be stored in the candidate key phrase store 345. In one embodiment, the image is selected for further analysis upon detection of a formatting character (e.g., '#') potentially identifying the presence of a key phrase in the image. Thus, in this embodiment, detection of a particular key phrase commences only if the predefined formatting character (or other predefined identifier) is first detected within the image.

Candidate Filter Process Overview

Figure 6:
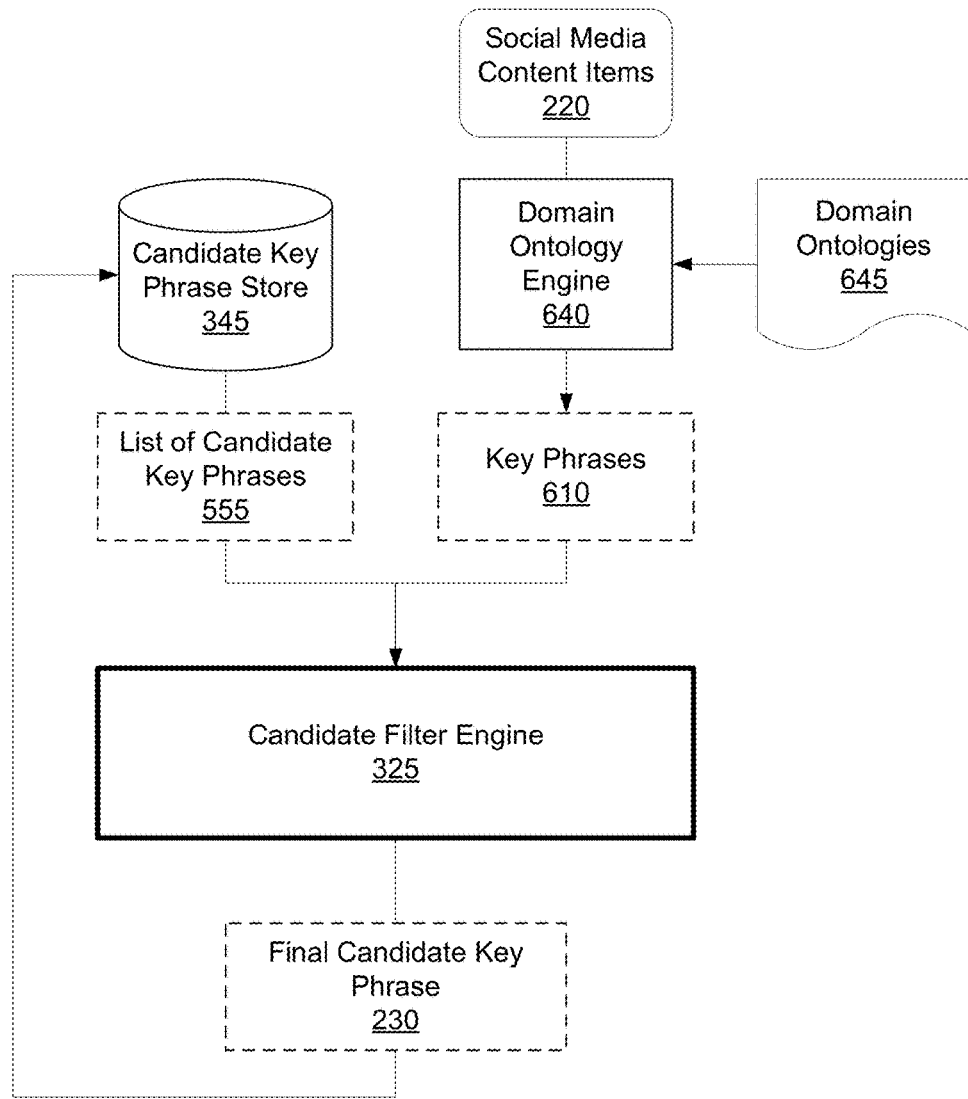
FIG. 6 is a flow diagram illustrating a candidate filter process, according to one embodiment.

FIG. 6 illustrates one embodiment of a flow diagram of the candidate filter engine 320. The candidate filter engine 320 filters the list of candidate key phrases 555 using key phrases 610 that appear in a subset social media content items 200 and determines a final candidate key phrase 230 that most likely matches what appeared in the image from the time based media event. In one embodiment, the candidate filter engine 320 also filters the social media content items to include only those social media content items having a broadcast time stamp during or after the airing of the time based media event in which the selected image appeared. The candidate filter engine 320 may perform domain ontology filtering to filter the subset of social media content items that are used to determine the final candidate key phrase, as further described below.

The candidate filter engine 320 determines a score for each candidate key phrase in the list of candidate key phrases 555. In one embodiment, the score for a candidate key phrase is determined based on frequency of appearance of the key phrase 610 in the subset of social media content items with known association to the segmented video event 435 including the selected image. The manner in which the score is determined based on the frequency may be a mathematic function (e.g., score is proportional to frequency, or some variant thereof), or it may be a more complicated metric in which the subset of social media content items with known association to the segmented video event 435 including the selected image are processed to determine the metric. For example, a machine learning model could be trained using a larger set of social media content items containing the candidate key phrase and having a known association to the segmented video event 435 including the selected image. The key phrase and/or above-identified subset of social media content items could then be input into the model to determine the score for a candidate key phrase. In the same or a different embodiment, the score may also be based on evaluations of the quality of the author of the social media content items in the subset. The quality determination may be based on the number of social media content items authored in general, and/or based on a level of engagement by other social media users with that author's social media content items.

In the same or a different embodiment, the confidence scores of each of the characters of the candidate key phrase may be used to determine the score of the candidate key phrase. In yet another embodiment, the score for a candidate key phrase is determined based on frequency of appearance of the key phrase 610 in social media content items with broadcast time stamps within an interval amount of time from an airing time stamp of the segmented video event 435. Based on the determined scores, a final candidate key phrase 230 with a highest score is selected that best represents the image of the key phrase in the portion of the selected image. In one embodiment, the final candidate key phrase 230 is stored in the candidate key phrase store 345.

In one embodiment, prior to filtering by the candidate filter engine 320, a domain ontology engine 640 uses domain ontologies 645 to pre-filters the social media content items 220 used by the candidate filter engine 320. The domain ontologies 645 indicate vocabularies specific to different media domains for storage in domain ontologies 330, and is one means for doing so. The domain ontologies 330 are beneficial for filtering, since nicknames, slang, acronyms, and other shortened terms commonly are used in certain domains. Domain ontologies 330 may be organized hierarchically as graphs, where each node in the graph represents a concept, e.g. "football play," or "scoring play," and each edge represents a relation between concepts, e.g. "type of" Concept instances (e.g., a specific touchdown play from a specific football game) may also be encoded in the domain ontology, as well as, vocabularies that provide alternate terminology for concept nodes, e.g. "TD" for concept "touchdown." The domain ontologies 330 may be engineered based on the knowledge of human experts or machine-generated.

The domain ontology engine 315 uses the domain ontologies 330 for initial filtering of social media content items. Initial filtering of social media content items can reduce the amount of time and processing power required to generate the scores for the candidate key phrases. In one embodiment, the social media content items are filtered by domain to which the time-based media in question belongs. Examples of domains include sports, news, episodic television, reality or live event shows, movies, and advertising in conjunction with any of these domains. More specific domains also are possible, e.g., football games, entertainment news, specific reality TV shows, etc., each of which may have their own domain-specific ontology.

Example of Image Processing During the Candidate Generation Process

FIG. 7 is an example of the candidate generation process 500 described in FIG. 5, specifically for feature location identification 520, filtered location determination 530, and key phrase location identification 540. In this example, the selected image is taken from a segmented video event 435 of a trailer for the movie The Heat™.

Figure 7A:
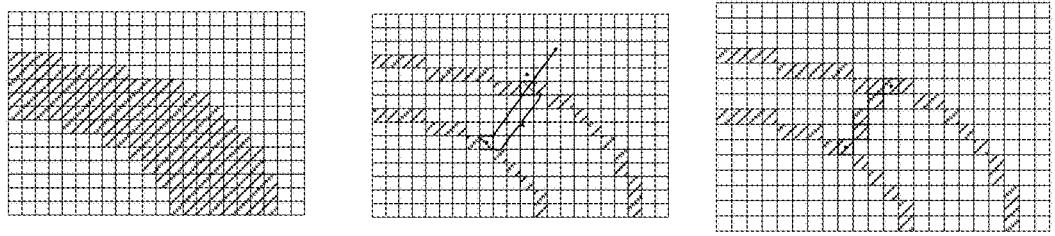
FIG. 7A is an example of pixels being processed using feature-locating algorithms, according to one embodiment.

FIG. 7A is an example of the candidate generation engine 315 identifying 520 feature locations by applying the stroke width transform (SWT). A feature, such as a dark cluster or stroke of pixels against a light background, is identified and a gradient of a pixel on an edge of the feature is followed from the pixel to a second edge of the feature. The feature can also be a light cluster or stroke of pixels against a dark background or any cluster or stroke of pixels against a contrasting background.

Figure 7B:
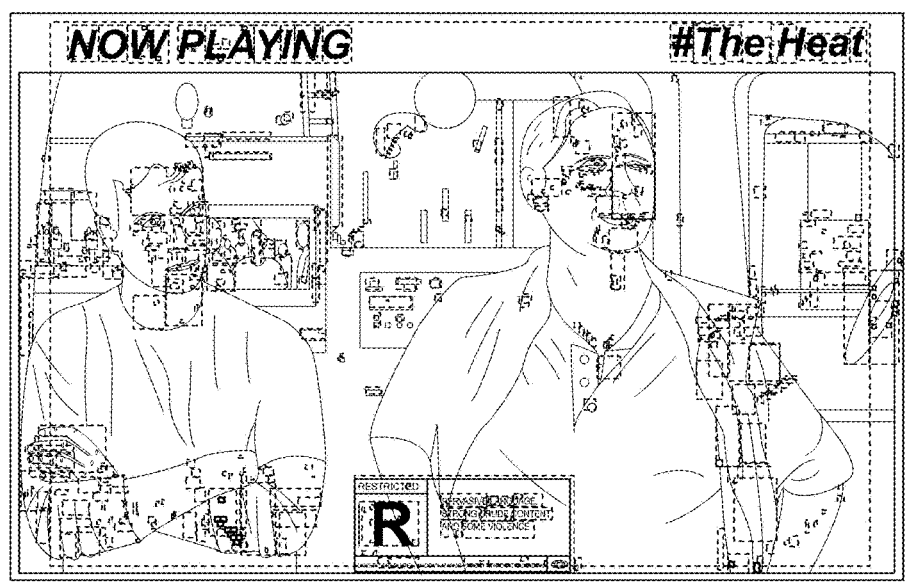
FIG. 7B is an example of an image after applying a feature-locating algorithm, according to one embodiment.

FIG. 7B is an example of the candidate generation engine 315 applying a feature-locating algorithm, such as the SWT, to a selected image of a segmented video event 435 in a video feed 210. For example, the feature-locating algorithm compares a pixel to neighboring pixels and locates clusters of pixels neighboring each other where the pixels in a cluster have less than a threshold value of difference in pixel value. In the embodiment shown in FIG. 7B, the located clusters are defined with boxes.

Figure 7C:
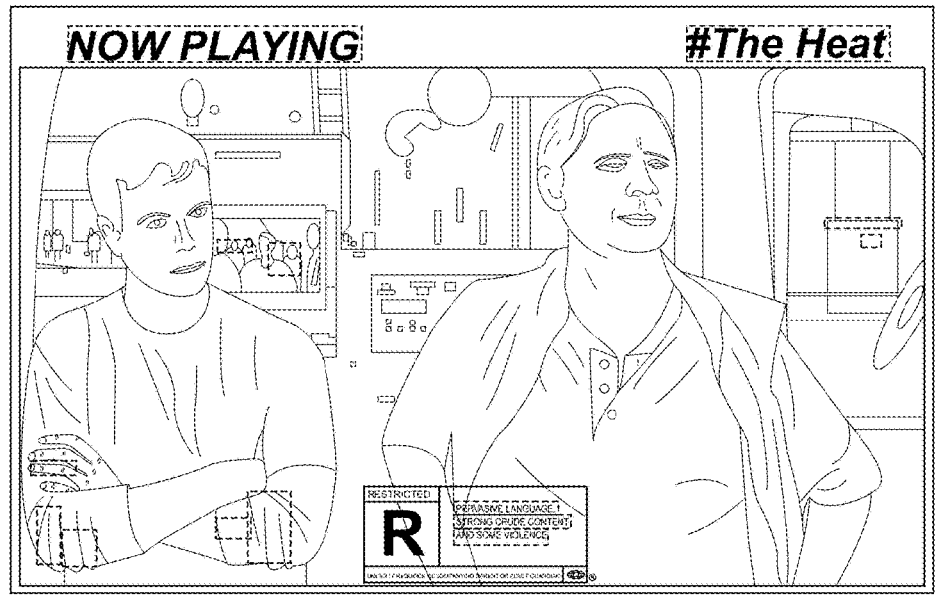
FIG. 7C is an example of determining filtered locations using filtering algorithms on the image of FIG. 7B, according to one embodiment.

FIG. 7C is an example of the candidate generation engine 315 determining 530 filtered locations by using filtering algorithms to identify feature locations that meet a specific criterion. In one example, as shown in FIG. 7C, the specific criterion is cluster width. Using cluster width as the specific criterion helps remove feature locations including only specks or noise, which will have smaller cluster widths than a cluster width of a symbol, such as a letter or number. In addition, other attributes of neighboring feature locations can be the specific criterion used to filter the feature locations for filtered locations. In the embodiment shown in FIG. 7C, the candidate generation engine 315 removes the feature locations of FIG. 7B with clusters comprising widths less than a threshold width value. The candidate generation engine 315 can also determine 530 filtered locations by additional algorithms comprising variance filters, aspect ratio filters, component size filters, vertices filters, and other suitable filters for comparing clusters.

Figure 7D:
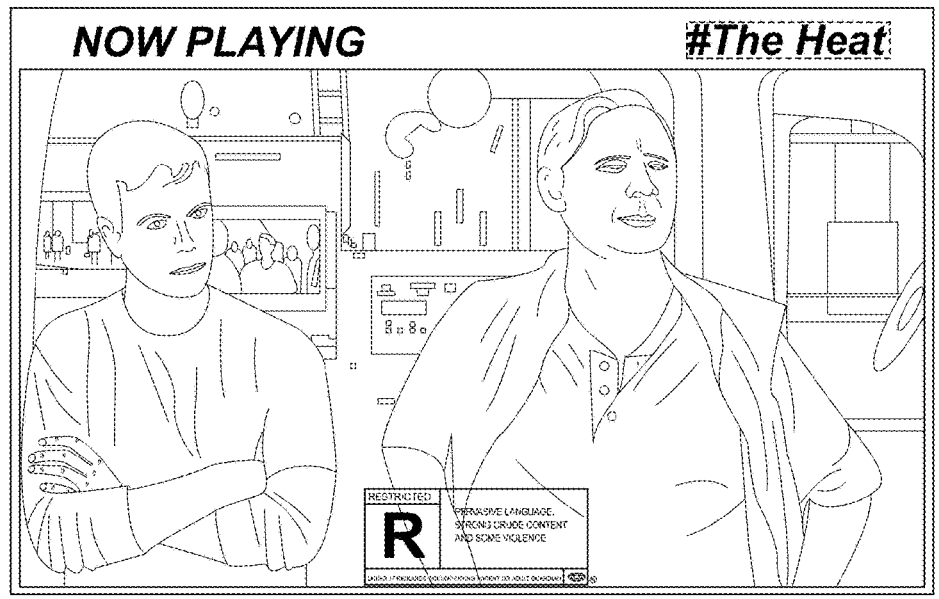
FIG. 7D is an example of identifying key phrase locations using character recognition algorithms on the filtered locations of the image of FIG. 7C, according to one embodiment.

FIG. 7D is an example of the candidate generation engine 315 identifying 540 key phrase locations in the feature locations. OCR is applied on the feature locations and the feature locations with a formatting element in the key phrase are identified. The identified feature locations with the formatting element are the key phrase locations. In the embodiment shown in FIG. 7D, "NOW PLAYING" is no longer boxed because OCR did not identify the leftmost symbol as a formatting element or "#." However, "#The-Heat" is boxed and identified 540 as a key phrase location because the leftmost symbol was identified as the formatting element.

FIG. 7E shows a result of the candidate generation engine 315 processing the key phrase location identified in FIG. 7D with additional processing algorithms. The candidate generation engine 315 processes the key phrase location with a smoothing algorithm to improve contrast of the image of the key phrase in the key phrase location. Additional algorithms for processing key phrase locations comprise resizing transforms, cluster-based threshold algorithms such as Otsu binarization, noise-reduction algorithms such as a median blur, and other suitable image enhancement transforms.

Example of the Candidate Filter Process

FIG. 8 is a flowchart of an example of selecting a final candidate key phrase 230 from the list of candidate key phrases 555 for an image of a key phrase in a key phrase location, where the key phrase location is an image from a segmented video event 435. The final candidate key phrase 230 is selected based at least in part on social media content items 220 associated with the segmented video event 435. Using character recognition alone is not a completely accurate method for identifying the key phrase since character recognition algorithms do not accurately recognize symbols or characters in images of text. The image of a key phrase, in the example of FIG. 8, is the key phrase associated with the key phrase location identified in FIG. 7E.

FIG. 8A is the key phrase location identified 520 in FIG. 7D after being processed with additional image processing algorithms, as shown in FIG. 7E. The key phrase location is processed using character recognition algorithms to identify candidates for each symbol in the image of the key phrase in the key phrase location. In this example, the symbols in the image of the key phrase are "#," "t," "h," "e," "h," "e," "a," and "t," however OCR may result in several possibilities for each symbol. Then, a subset of the possible symbols for each symbol is selected. The subset may be a subset including all possible symbols comprising character recognition confidence scores exceeding a threshold confidence score or all the possible symbols. For example, the top percentage of candidates for each symbol in the image of the key phrase is used to create permutations to generate a list of candidate key phrases 555 as shown in FIG. 8B.

FIG. 8C is an example of social media content items 220 including key phrases 610 associated with the segmented video event 435 used to score and thus filter and constrain the generated list of candidate key phrases 555. For example, each social media content item 220 comprises a key phrase in text format where the key phrase is a candidate key phrase from the list of candidate key phrases 555. In other examples, each social media content item 220 comprises a key phrase 610 with a known association with the segmented video event 435 or with the video feed 210 from which the segmented video event 435 was segmented or comprises a broadcast time stamp within an interval amount of time from the airing time stamp of the segmented video event 435. Social media content items may also contain multiple key phrases, including any combination of the options listed above.

As shown in FIG. 8C, several example social media content items 220 comprise the key phrase "#theheat." In one embodiment, social media content items 220 including the key phrase "#theheat" were used to score the candidate key phrase "#theheat" in the list of candidate key phrases 555. The social media content items 220 comprising "#theheat" may have been selected because the key phrase "#theheat" is a candidate key phrase in the list of candidate key phrases or because the key phrase "#theheat" is a known key phrase associated with the segmented video event 435. The number of social media content items 220 including an instance of the key phrase "#theheat" is used to score the candidate key phrase "#theheat." For example, the score for the candidate key phrase "#theheat" is the number of social media content items 220 including the key phrase "#theheat."

Preferences specific to viewers can be used to score candidate key phrases. For example, if the video feed 210 was presented to English-speaking viewers, the list of candidate key phrases 555 is filtered to only include candidate key phrases including words in the English language. Then, those filtered candidate key phrases including words in the English language are analyzed. In addition, other attributes of candidate key phrases can be used to score candidate key phrases. FIG. 8D shows a final candidate key phrase 230 selected from the list of candidate key phrases 555.

Method Overview for the Candidate Generation and Filter Process

Figure 9:
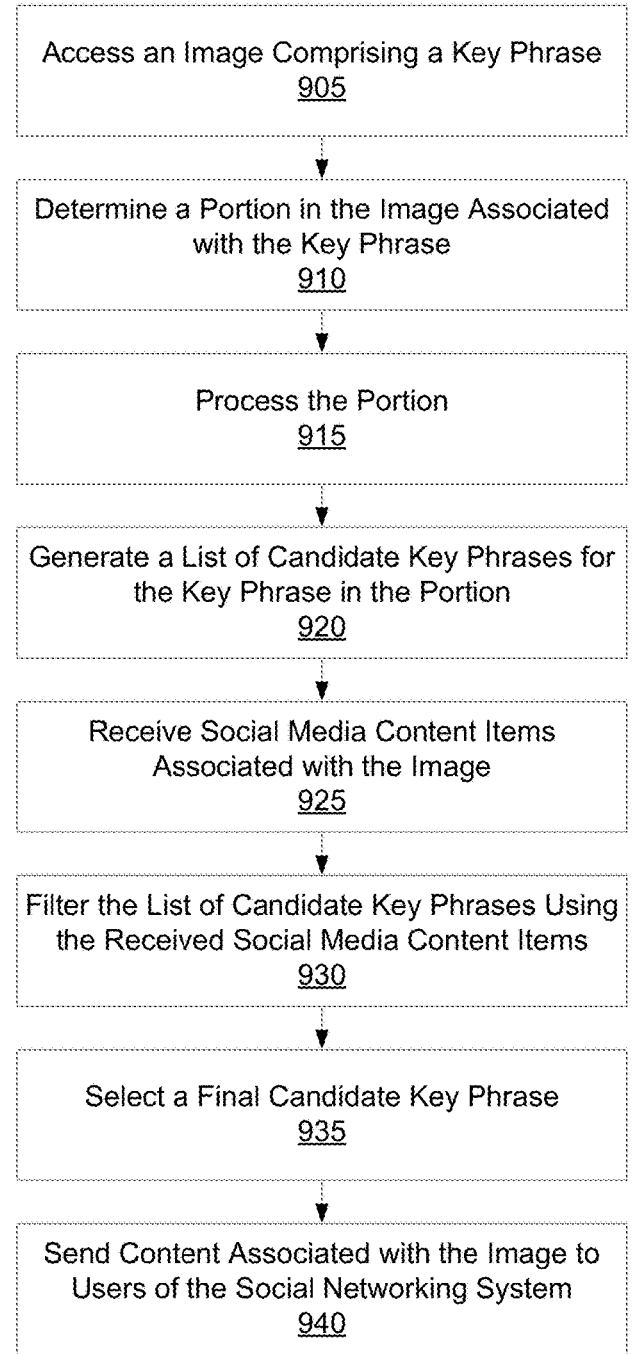
FIG. 9 is an example of a method of identifying a key phrase, according to one embodiment.

FIG. 9 is a flowchart of an embodiment of a method for identifying key phrases. An image is accessed 905 comprising a key phrase. A portion of the image associated with a key phrase is determined 910. In one embodiment, the portion is determined 910 using feature locating algorithms, such as a stroke-width transform, and a character recognition algorithm, such as OCR. The portion is processed 915, for example, using a character recognition algorithm. In one embodiment, the character recognition algorithm is OCR. Based on results from the processed 915 portion, a list of candidate key phrases 920 is generated for the key phrase in the portion of the received image.

Social media content items associated with the image are received 925. The social media content items can be associated based on broadcast time stamps of the social media content items being within an interval amount of time with an airing time stamp of the image, wherein the airing time stamp is based on the segmented video event the image is received 905 from. The list of candidate key phrases is filtered 930 using the received social media content items. For example, the received social media content items can be used to determine scores for each candidate key phrase in the list of candidate key phrases. The scores can be based on frequency of the candidate key phrases in the received social media content items associated with the image. Then, a final candidate key phrase is selected 935. Based on the selected 935 final candidate key phrase, content items such as social media content items associated with the segmented video event are selected 940 for presentation to one or more users. In addition, the content items associated with the segmented video event selected for presentation to one or more users can also be based on the social media content items associated with the image from the segmented video event.

Additional Considerations

Though the description of the disclosed method and system has been presented relative to a movie trailer, the disclosed method and system can be applied to television shows, television feeds, online (e.g., internet) video clips and video streams (or feeds), advertisements, movies, radio shows, or any type of video media. Such video media may include just the video and audio content alone, or may include additional metadata about the video media as well. More generally, since individual images from those video media are used to identify a key phrase, the description above is equally applicable to any kind of graphic media including, for example, still images, pictures, web site content, print media, books, magazines, billboards, public displays, etc. Thus, video media is an example use case and is not specifically required.

The foregoing description of the embodiments of the disclosed method has been presented for the purpose of illustration; it is not intended to be exhaustive or to limit the disclosed method to the precise forms disclosed. Persons skilled in the relevant art can appreciate that many modifications and variations are possible in light of the above disclosure.

Some portions of this description describe the embodiments of the disclosed method in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed method may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed method be limited not by this detailed description, but rather by any claims that issue on an application based hereon. Accordingly, the disclosure of the embodiments of the disclosed method is intended to be illustrative, but not limiting, of the scope of the disclosed method, which is set forth in the following claims.

What is claimed is:

1. A computer-executed method comprising:
   accessing an image comprising an unidentified key phrase in image format;
   processing a portion of the image associated with the unidentified key phrase using a character recognition algorithm to generate a list of candidate key phrases in text format;
   accessing, by a computer processor, a plurality of social media content items in text format authored by users of a social networking system, the social media content items each comprising at least one key phrase previously associated with the image and at least one of the candidate key phrases;
   determining, by the computer processor, for each candidate key phrase, a count of the number of the content items comprising that candidate key phrase and at least one of the key phrases previously associated with the image;
   selecting, by the computer processor, one of the candidate key phrases as being the unidentified key phrase based on the determined count of the content items in each set; and
   sending content associated with the image to one or more users of the social networking system based on the social media content items including the selected candidate key phrase.

2. The computer-executed method of claim 1, wherein accessing the image comprises extracting the image from a segment of time based media comprising a television show.

3. The computer-executed method of claim 1, wherein the unidentified key phrase comprises a formatting element such as a hash character.

4. The computer-executed method of claim 1, wherein the candidate key phrases in text format are filtered based on an identified language of the text in the social media content items.

5. The computer-executed method of claim 1, further comprising generating additional candidate key phrases using social media content items associated with authors of the accessed social media content items.

6. The computer-executed method of claim 1, wherein the social media content items comprise a plurality of unique second key phrases.

7. The computer-executed method of claim 1, wherein the image is associated with an airing time stamp, and wherein each social media content item in the plurality of social media content items comprises a broadcast time stamp within a threshold amount of time from the airing time stamp.

8. The computer-executed method of claim 1, wherein the second key phrase is not previously known to be associated with the image.

9. A non-transitory computer readable storage medium product for identifying an unidentified key phrase in an image comprising computer program instructions that when executed by a processor cause the processor to:
   access an image comprising an unidentified key phrase in image format;
   process a portion of the image associated with the unidentified key phrase using a character recognition algorithm to generate a list of candidate key phrases in text format;
   access, by a computer processor, a plurality of social media content items in text format authored by users of a social networking system, the social media content items each comprising at least one phrase previously associated with the image and at least one of the candidate key phrases;
   determine, by the computer processor, for each candidate key phrase, a count of the number of the content items comprising that candidate key phrase and at least one of the key phrases previously associated with the image;

select one of the candidate key phrases as being the unidentified key phrase based on the determined count of the content items in each set; and send content associated with the image to one or more users of the social networking system based on the social media content items including the selected candidate key phrase.

10. The computer readable storage medium product of claim 9, wherein the computer program code that when executed by the processor further causes the processor to access the image extracting the image from a segment of time based media comprising a television show.

11. The computer readable storage medium product of 9, wherein the unidentified key phrase comprises a formatting element such as a hash character.

12. The computer readable storage medium product of 9, wherein the candidate key phrases in text format are filtered based on an identified language of the text in the social media content items.

13. The computer readable storage medium product of 9, wherein the computer program code that when executed by the processor further causes the processor to generate additional candidate key phrases using social media content items associated with authors of the accessed social media content items.

14. The computer readable storage medium product of 9, wherein the social media content items comprise a plurality of unique second key phrases.

15. The computer readable storage medium product of 9, wherein the image is associated with an airing time stamp, and wherein each social media content item in the plurality of social media content items comprises a broadcast time stamp within a threshold amount of time from the airing time stamp.

16. The computer readable storage medium product of 9, wherein the second key phrase is not previously known to be associated with the image.

17. A system comprising a processor and a memory storing computer program instructions for identifying an unidentified key phrase in an image that when executed by the processor cause the processor to:

access an image comprising an unidentified key phrase in image format;

process a portion of the image associated with the unidentified key phrase using a character recognition algorithm to generate a list of candidate key phrases in text format;

access, by a computer processor, a plurality of social media content items in text format authored by users of a social networking system, the social media content items each comprising at least one key phrase previously associated with the image and at least one of the candidate key phrases;

determine, by the computer processor, for each candidate key phrase, a count of the number of the content items comprising that candidate key phrase and at least one of the key phrases previously associated with the image;

select one of the candidate key phrases as being the unidentified key phrase based on the determined count of the content items in each set; and send content associated with the image to one or more users of the social networking system based on the social media content items including the selected candidate key phrase.

18. The system of 17, wherein the computer program instructions that when executed by the processor further causes the processor to access the image extracting the image from a segment of time based media comprising a television show.

19. The system of 17, wherein the unidentified key phrase comprises a formatting element such as a hash character.

20. The system of 17, wherein the candidate key phrases in text format are filtered based on an identified language of the text in the social media content items.

21. The system of 17, wherein the computer program code that when executed by the processor further causes the processor to generate additional candidate key phrases using social media content items associated with authors of the accessed social media content items.

22. The system of 17, wherein the social media content items comprise a plurality of unique second key phrases.

23. The system of 17, wherein the image is associated with an airing time stamp, and wherein each social media content item in the plurality of social media content items comprises a broadcast time stamp within a threshold amount of time from the airing time stamp.

24. The system of claim 17, wherein the second key phrase is not previously known to be associated with the image.

* * * * *